Patented Jan. 29, 1924.

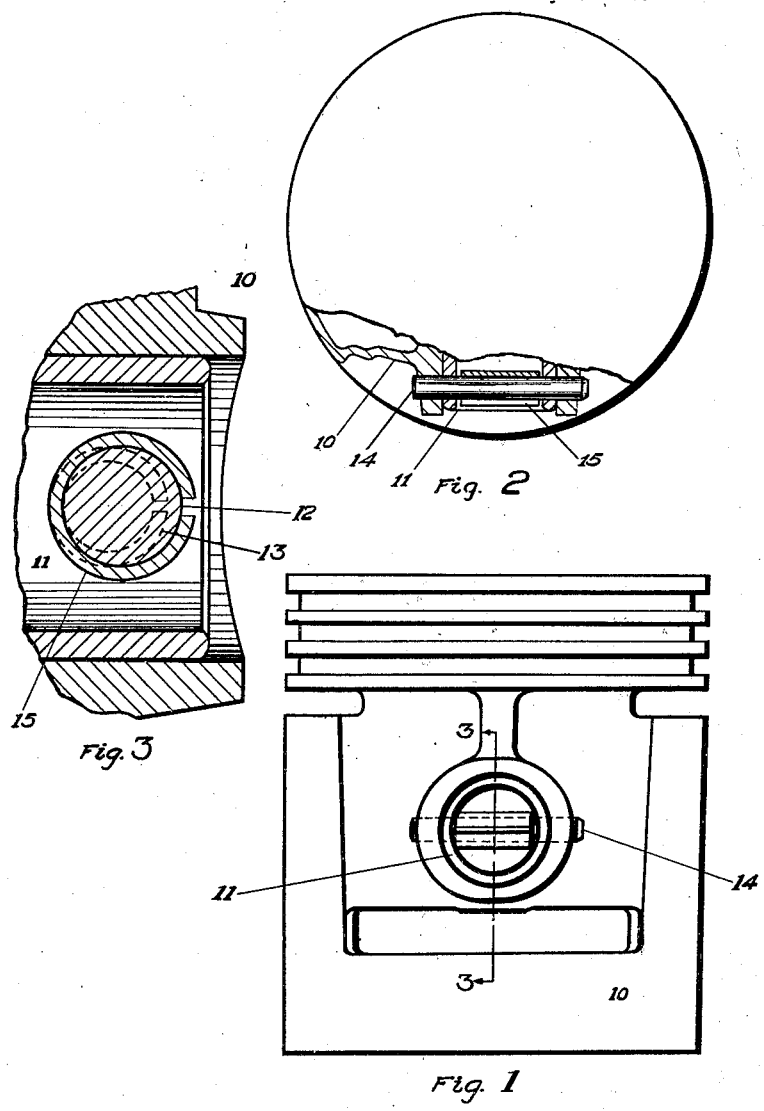

1,482,135

UNITED STATES PATENT OFFICE.

THOMAS J. LITLE, JR., OF DETROIT, MICHIGAN, ASSIGNOR TO FORD MOTOR COMPANY, OF DETROIT, MICHIGAN, A CORPORATION OF DELAWARE.

METHOD OF SECURING WRIST PINS IN PISTONS.

Application filed March 29, 1923. Serial No. 628,520.

*To all whom it may concern:*

Be it known that I, THOMAS J. LITLE, Jr., a citizen of the United States, and residing in the city of Detroit, in the county of Wayne and State of Michigan, have invented new and useful Improvements in a Method of Securing Wrist Pins in Pistons, of which the following is a specification.

The object of my invention is to provide improvements in the method of securing wrist pins in pistons, of simple, durable, and inexpensive construction.

A further object of my invention is to provide means for detachably securing wrist pins in pistons in such a way that the wrist pins will be very rigidly held in place during the use of the piston in the engine.

A further object of my invention is to provide a retaining device for wrist pins comprising a pin which may be driven thru the wrist pin retaining sleeve for a piston and thru registering openings in the wrist pin, and to provide retaining means within the hollow wrist pin for holding the pin in place.

A further object of my invention is to provide retaining means for the wrist pin holding device which will securely lock the holding device in place during the use of the piston in a cylinder but which is readily removable when the piston is removed from the cylinder and it is desired, for any reason, to replace the wrist pin.

With these and other objects in view, my invention consists in the arrangement, combination and construction of the various parts of my improved device, as described in the specification, claimed in my claims and shown in the accompanying drawings, in which:

Figure 1 shows a side elevation of a piston having the wrist pin therein and my improved wrist pin retaining device installed thereon.

Figure 2 shows a top or plan view of the device shown in Figure 1, and

Figure 3 shows a vertical, sectional view taken on the line 3—3 of Figure 1.

Referring to the accompanying drawings, I have used the reference numeral 10 to indicate generally a split skirt piston of aluminum or other similar material. It will be understood that this type of piston is very well standardized in automobile construction at the present time but that my invention is particularly valuable in connection with this type of piston as with these pistons the expansion and contraction of the metal is relatively great at the varying engine temperatures so that a great deal of difficulty has been experienced in securing the wrist pins into these pistons as the wrist pins are of steel so that the fastening devices which have been in use in connection with the ordinary cast iron pistons would not work satisfactorily as they permitted play of the piston relative to the wrist pin at certain temperatures due to the large difference in the coefficients of expansion of these aluminum pistons and the steel wrist pin.

A wrist pin 11 of ordinary construction, that is, a hollow or tubular member formed from steel and of cylindrical shape, is inserted thru a hole extending thru the piston 10, to form a pintle or wrist pin to which the connecting rod (not shown) may be connected.

Heretofore considerable difficulty has been experienced in holding this cylindrical wrist pin 11 from rotating in the hole thru the piston as well as from moving endwise therein as, of course, such movement wears the opening in the comparatively soft metal of the piston so that the wrist pin is allowed movement thereby making the engine noisy and in time causing a possibility of serious damage to the engine.

This wrist pin 11 has an opening 12 therein which registers with corresponding openings in the boss receiving the wrist pin in the piston so that a pin 13 may be driven thru the openings in the boss in the piston 10 and the openings 12 in the wrist pin to thereby hold the wrist pin from longitudinal or rotary movement relative to the piston. This pin 14 has one end tapered, or, perhaps both ends may be tapered, if desired. The central portion forms a driving fit with the openings in the piston boss and the openings in the wrist pin. The pin 14 is further held in place by being driven thru a split sleeve 15 formed of relatively heavy resilient material which is substantially equal in length to the entire diameter of the wrist pin and is designed to embrace the locking pin 14 within the wrist pin to prevent loosening of the wrist pin and accidental displacement thereof. This split resilient sleeve 15 is so designed that it is normally of substantially less diameter than the locking pin 14 but sufficiently large so that the tapered end of the pin 14 may be forced thru the sleeve 15 to expand same when the pin is driven into place. When the pin has been so driven it will be seen that the sleeve 15 will frictionally engage the surface of the locking pin 14 with great force so that the accidental displacement or movement of the locking pin within the piston boss or the wrist pin will be eliminated.

When it is desired to remove the wrist pin from the piston the pin 14 may be driven out from the sleeve 15 and the wrist pin and piston by tapping it with a suitable punch.

Thru an extended experience with the securing of wrist pins in alloy piston I have not as yet found any other method of fastening these wrist pins which compares in any respect with the method herein disclosed. The advantages of this method consist, generally speaking, in an easier assembly and disassembly, and a piston fastening of the wrist pin which does not accidently, or thru any other cause, become loosened with wear or use. Tests have been made both by block test and under actual running conditions in connection with the use of this improved locking device and the advantages above set forth have been disclosed thereby.

It will be seen that this method of fastening makes it unnecessary to drill tapered holes as would be necessary in connection with tapered pins and makes it unnecessary to use threads in connection with screws, bolts, or the like, while it permits the holes which are drilled thru the piston and wrist pin to be exactly the same diameter. This permits the piston maker to eliminate a large possibility of error in machining together with eliminating the expense of the constructions mentioned. Straight drills such as are necessary for drilling pistons and wrist pins, are readily held to desired sizes and the locking pin itself may be formed to a desired diameter with comparatively simple and inexpensive machine operations. The retaining sleeve and the taper and the end of the pin need not be held to close limits in connection with their forming, so that the expense of close machine operations in connection with this job is practically eliminated while the efficiency of the retaining device is remarkable.

Some changes may be made in the arrangement and construction of the various parts of my improved device without departing from the spirit of the invention therein, and it is my intention to cover by my claims such changes as may be reasonably included within the scope thereof.

I claim as my invention:

1. In a device of the character described, a piston having wrist pin receiving bosses therein, one of said bosses having aligned openings therein, a hollow cylindrical wrist pin designed to be received in said bosses, said wrist pin having aligned openings adjacent to one end designed to register with the openings in the boss, a split sleeve of resilient material, and a locking pin designed to be driven thru the registering openings and the split sleeve whereby the locking pin and the wrist pin may be held from movement.

2. In a device of the character described, a piston having aligned bosses therein designed to receive a wrist pin, a hollow cylindrical wrist pin received within said bosses one of said bosses and the wrist pin having aligned openings therethru, a locking pin extended thru said openings, and resilient means disposed within the wrist pin and adapted to co-act with the locking pin to hold the latter from movement.

3. Means for locking a hollow cylindrical member within another member comprising a pin extended thru the first and second members and a resilient split sleeve normally of less diameter than the pin designed to engage the pin within the cylindrical member to lock the pin from movement.

Dated March 12, 1923.

THOMAS J. LITLE, Jr.